(12) United States Patent
Ma et al.

(10) Patent No.: US 7,951,351 B2
(45) Date of Patent: May 31, 2011

(54) METHOD FOR PREPARING UNIFORM SINGLE WALLED CARBON NANOTUBES

(75) Inventors: Jun Ma, Lexington, MA (US); Howard Tennent, Kennett Square, PA (US)

(73) Assignee: Hyperion Catalysis International, Inc., Cambridge, MA (US)

(*) Notice: Subject to any disclaimer, the term of this patent is extended or adjusted under 35 U.S.C. 154(b) by 166 days.

(21) Appl. No.: 11/693,261

(22) Filed: Mar. 29, 2007

(65) Prior Publication Data
US 2008/0279751 A1 Nov. 13, 2008

Related U.S. Application Data

(60) Provisional application No. 60/743,939, filed on Mar. 29, 2006.

(51) Int. Cl.
*D01C 5/00* (2006.01)
*D01F 9/12* (2006.01)

(52) U.S. Cl. .................. 423/447.3; 423/447.1; 977/735; 977/742; 977/750

(58) Field of Classification Search ............... 423/447.3, 423/447.1, 445 R; 997/734; 977/735, 742, 977/750
See application file for complete search history.

(56) References Cited

U.S. PATENT DOCUMENTS

| | | | |
|---|---|---|---|
| 4,663,230 A | 5/1987 | Tennent | |
| 5,171,560 A | 12/1992 | Tennent | |
| 5,424,054 A | 6/1995 | Bethune et al. | |
| 6,221,330 B1 | 4/2001 | Moy et al. | |
| 6,333,016 B1 | 12/2001 | Resasco et al. | |
| 6,761,870 B1 | 7/2004 | Smalley et al. | |
| 6,949,237 B2* | 9/2005 | Smalley et al. | 423/447.3 |
| 7,052,668 B2* | 5/2006 | Smalley et al. | 423/447.3 |
| 7,550,128 B2 | 6/2009 | Wagner | |
| 2002/0031465 A1 | 3/2002 | Saito | |
| 2002/0130610 A1 | 9/2002 | Gimzewski et al. | |
| 2002/0159943 A1 | 10/2002 | Smalley et al. | |
| 2003/0124717 A1* | 7/2003 | Awano et al. | 435/287.2 |
| 2004/0022719 A1 | 2/2004 | Beguin et al. | |
| 2004/0179989 A1 | 9/2004 | Height et al. | |
| 2005/0255030 A1 | 11/2005 | Tour et al. | |
| 2006/0093545 A1 | 5/2006 | Maruyama et al. | |
| 2008/0176069 A1 | 7/2008 | Ma et al. | |
| 2009/0286084 A1 | 11/2009 | Tennent et al. | |
| 2010/0221173 A1 | 9/2010 | Tennent et al. | |
| 2011/0002838 A1 | 1/2011 | Tennent et al. | |

FOREIGN PATENT DOCUMENTS

| | | |
|---|---|---|
| WO | 0238496 A1 | 5/2002 |
| WO | WO 2004/106234 A1 | 12/2004 |
| WO | 2006130150 A2 | 12/2006 |

OTHER PUBLICATIONS

A. Okamoto, H. Shinohara. Control of diameter distribution of single-walled carbon nanotubes using the zeolite-CCVD method at atmospheric pressure, Carbon 2005, 43, 431-436.*

Zheng, Ming et al., "DNA-assisted Dispersion and Separation of Carbon Nanotubes", Nature Materials, vol. 2 (May 2003).
Maruyama, Shigeo et al., "Synthesis of Single-Walled Carbon Nanotubes with Narrow Diameter-Disribution From Fullerene", Chemical Physics Letters 375 (2003) 553-559.
Dresselhaus, M.S. et al., "Physics of Carbon Nanobutes", Carbon, vol. 33, No. 7, pp. 883-891 (1995).
Zhang, Y. et al., "Formation of Single-wall Carbon Nanotubes by Laser Ablation of Fullerenes at Low Temperature", Applied Physics letters, vol. 75, No. 20, Nov. 15, 1999.
Doherty, S.P., "Solid-state Synthesis of Multiwalled Carbon Nanotubes", J. Mater Res., vol. 18, No. 4, Apr. 2003).
O'Connell, Michael, "Band Gap Fluorescence From Individual Single-Walled Carbon Nanotubes", Science, vol. 297, Jul. 26, 2002.
Charlier, Jean-Christophe, "Growth Mechanisms of Carbon Nanotubes", Carbon Nanotubes Topics Appl. Physics, 80, 55-81 (2001).
Moore, Valerie Co., et al., "Individually Suspended Single-Walled Carbon Nanotubes in Various Surfactants", Nano Letters, vol. 3, No. 10, pp. 1379-1382 (2003).
International Search Report PCT/US 07/655530.
Baker and Harris, Chemistry and Physics of Carbon, Walker and Thrower ed., vol. 14, 1978, p. 83.
Bandow, S. et al., "Effect of the growth temperature on the diameter distribution and chirality of single-wall carbon nanotubes," Physical Review Letters, 80(17):3779-3782 (1998).
Bethune, D S, et al., "Cobalt-catalysed Growth of Carbon Nanotubes With Single-Atomic-Layer Walls," Nature, vol.363, p. 605-607 (1993).
Chen et al., "Synthesis of Uniform Diameter single-wall Carbon Nanotubes in Co-MCM-41: Effects of the Catalyst Prereduction and Nanotube Growth Temperatures," Journal of Catalysis, 225:453-465 (2004).
Dai, H., et al., "Single-Wall Nanotubes Produced by Metal-Catalyzed Disproportionation of Carbon Monoxide", Chemical Physics Letters 260: 471-475 (1996).
de Heer, Walt A., "Nanotubes and the Pursuit of Applications," MRS Bulletin, Apr. 2004.
Guo, T., et al., "Catalytic growth of single-walled nanotubes by laser vaporization" Chem. Phys. Lett. vol. 243, Issues 1-2, pp. 49-54 (1995). Hata, K., et al., "Water-Assisted Highly Efficient Synthesis of Impurity-Free Single-Walled Carbon Nanotubes," Science, vol. 306, pp. s1362-s1364 (2004).
Hu, M., et al., "Morphology and chemical state of Co-Mo catalysts for growth of single-walled carbon nanotubes vertically aligned on quartz substrates," Journal of Catalysis, 225, pp. 230-239 (2004).
Iijima, S. "Helical microtubules of graphitic carbon," Nature 354:56-58 (1991).

(Continued)

*Primary Examiner* — Jennifer K. Michener
*Assistant Examiner* — Carlos Barcena

(57) ABSTRACT

Methods of preparing single walled carbon nanotubes from a metal catalyst having deposited thereon fullerenes are provided. Fullerenes are deposited onto a metal catalyst precursor or metal catalyst. In the presence of a carbon containing gas, the metal catalyst precursor/fullerene composition is then exposed to conditions suitable for reducing the metal catalyst precursor, for subliming the fullerene and for growing single walled carbon nanotubes. The fullerenes form the end caps for the resulting single walled carbon nanotubes, which are uniform in diameter.

15 Claims, 13 Drawing Sheets

OTHER PUBLICATIONS

Iijima, S. and Ichihashi,T. "Single-shell carbon nanotubes of 1-nm diameter", Nature, vol.363, pp. 603-605 (1993).

Jishi, et al."Phonon modes in carbon nanotubes," Chemical Physics Letters, 209, pp. 77-82 (1993).

Jorio, A, et al., "Structural (n,m) Determination of Isolated Single-Wall Carbon Nanotubes by Resonant Raman Scattering," Physical Review Letters, The American Physical Society, vol. 86, No. 6, pp. 1118-1121 (2001).

Kitiyanan, B., "Controlled production of single-wall carbon nanotubes by catalytic decomposition of CO on bimetallic Co-Mo catalysts," Chemical Physics Letters, 317:497-503 (2000).

Maruyama, et al., "Low-temperature synthesis of high-purity single walled carbon nanotubes from alcohol," Chemical Physics Letters, 360, pp. 229-234 (2002).

Morjan, R.E., et al., "Growth of carbon nanotubes from C60" Applied Physics A 78:253-261 (2004).

Oberlin, A. & Endo, M., "Filamentous Growth of Carbon Through Benzene Decomposition," J. of Crystal Growth, vol. 32, pp. 335-349 (1976).

Okamoto, A., and Shinohara, H., "Control of Diameter Distribution of Single-Walled Carbon Nanotubes Using the Zeolite-CCVD Method at Atmospheric Pressure," Carbon 43:431-436 (2005).

Rodriguez, N., "A Review of Catalytically Grown Carbon Nanofibers," J. Mater. Research, vol. 8, pp. 3233-3250 (1993).

Thess, A., et al., "Crystalline Ropes of Metallic Carbon Nanotubes," Science, 273:483-487 (1996).

Weaver, J.H., "Totally Tubular," Science 265, pp. 611-612 (1994).

Jost, O. et al., "Diameter Grouping in Bulk Samples of Single-walled Carbon Nanotubes from Optical Absorption Spectroscopy," Applied Physics Letters, 75(15): 2217-2219 (1999).

Kataura, H., et al., "Diameter Control of Single-walled Carbon Nanotubes," Carbon 38:1691-1697 (2000).

Li, Y., et al., "Growth of Single-Walled Carbon Nanotubes from Discrete Catalytic Nanoparticles Various Sizes," J Phys. Chem. B, vol. 105:11424-11431 (2001).

Maruyama, et al., "Synthesis of single-walled carbon nanotubes with narrow diameter-distribution from fullerene," Chemical Physics Letters, 375, pp. 553-559 (2003).

Zhu, H. et al., "Carbon Nanotubes," Mechanical Industry Press, pp. 169-170 (2003) (Chinese language document; English translation of pp. 169-170 provided).

* cited by examiner ($C_{60}$/Fe/Si in $C_2H_4$/$H_2$)

($C_{60}$/Fe/Si in $CH_4$)

($C_{60}$/Ni/Si in Ar)

($C_{60}$/Ni/Si in $CH_4$)

(Ni/Si in $CH_4$)

(Fe/Si in $CH_4$)

(Fe-$C_{60}$/Si in $CH_4$ at 900°C)

(Ni-$C_{60}$/Si in $CH_4$ at 900°C)

(Fe/Si in $CH_4$ at 900°C)

(Ni/Si in $CH_4$ at 900°C)

METHOD FOR PREPARING UNIFORM SINGLE WALLED CARBON NANOTUBES

This application claims the benefit of and priority to U.S. Ser. No. 60/743,939, filed Mar. 29, 2006, the contents of which are hereby incorporated by reference.

BACKGROUND OF THE INVENTION

1. Field of Invention

The invention relates to methods for preparing single walled carbon nanotubes which are uniform in diameter. More specifically, the invention relates to methods for preparing single walled carbon nanotubes from a metal catalyst which has been seeded or coated with fullerene.

2. Carbon Nanotubes

This invention lies in the field of carbon nanotubes (also known as fibrils). Carbon nanotubes are vermicular carbon deposits having diameters less than 1.0μ, preferably less than 0.5μ, and even more preferably less than 0.2μ. Carbon nanotubes can be either multi walled (i.e., have more than one graphite layer on the nanotube axis) or single walled (i.e., have only a single graphite layer on the nanotube axis). Other types of carbon nanotubes are also known, such as fishbone fibrils (e.g., resembling nested cones), etc. As produced, carbon nanotubes may be in the form of discrete nanotubes, aggregates of nanotubes (i.e., dense, microscopic particulate structure comprising entangled or bundled carbon nanotubes) or a mixture of both.

Carbon nanotubes are distinguishable from commercially available continuous carbon fibers. For instance, the diameter of continuous carbon fibers, which is always greater than 1.0μ and typically 5 to 7μ, is far larger than that of carbon nanotubes, which is usually less than 1.0μ. Carbon nanotubes also have vastly superior strength and conductivity than carbon fibers.

Carbon nanotubes also differ physically and chemically from other forms of carbon such as standard graphite and carbon black. Standard graphite, because of its structure, can undergo oxidation to almost complete saturation. Moreover, carbon black is an amorphous carbon generally in the form of spheroidal particles having a graphene structure, such as carbon layers around a disordered nucleus. On the other hand, carbon nanotubes have one or more layers of ordered graphenic carbon atoms disposed substantially concentrically about the cylindrical axis of the nanotube. These differences, among others, make graphite and carbon black poor predictors of carbon nanotube chemistry.

Multi walled and single walled carbon nanotubes differ from each other. For example, multi walled carbon nanotubes have multiple layers of graphite along the nanotube axis while single walled carbon nanotubes only have a single graphitic layer on the nanotube axis.

The methods of producing multi walled carbon nanotubes also differ from the methods used to produce single walled carbon nanotubes. Specifically, different combinations of catalysts, catalyst supports, raw materials and reaction conditions are required to yield multi walled versus single walled carbon nanotubes. Certain combinations will also yield a mixture of multi walled and single walled carbon nanotubes.

Processes for forming multi walled carbon nanotubes are well known. E.g., Baker and Harris, *Chemistry and Physics of Carbon*, Walker and Thrower ed., Vol. 14, 1978, p. 83; Rodriguez, N., *J. Mater. Research*, Vol. 8, p. 3233 (1993); Oberlin, A. and Endo, M., *J. of Crystal Growth*, Vol. 32 (1976), pp. 335-349; U.S. Pat. No. 4,663,230 to Tennent et al.; U.S. Pat. No. 5,171,560 to Tennent et al.; Iijima, Nature 354, 56, 1991; Weaver, Science 265, 1994; de Heer, Walt A., "Nanotubes and the Pursuit of Applications," *MRS Bulletin*, April, 2004; etc. All of these references are herein incorporated by reference.

Processes for making single walled carbon nanotubes are also known. E.g., "Single-shell carbon nanotubes of 1-nm diameter", S Iijima and T Ichihashi *Nature*, vol. 363, p. 603 (1993); "Cobalt-catalysed growth of carbon nanotubes with single-atomic-layer walls," D S Bethune, C H Kiang, M S DeVries, G Gorman, R Savoy and R Beyers *Nature*, vol. 363, p. 605 (1993); U.S. Pat. No. 5,424,054 to Bethune et al.; Guo, T., Nikoleev, P., Thess, A., Colbert, D. T., and Smalley, R. E., Chem. Phys. Lett. 243: 1-12 (1995); Thess, A., Lee, R., Nikolaev, P., Dai, H., Petit, P., Robert, J., Xu, C., Lee, Y. H., Kim, S. G., Rinzler, A. G., Colbert, D. T., Scuseria, G. E., Tonarek, D., Fischer, J. E., and Smalley, R. E., Science, 273: 483-487 (1996); Dai., H., Rinzler, A. G., Nikolaev, P., Thess, A., Colbert, D. T., and Smalley, R. E., Chem. Phys. Lett. 260: 471-475 (1996); U.S. Pat. No. 6,761,870 (also WO 00/26138) to Smalley, et. al; "Controlled production of single-wall carbon nanotubes by catalytic decomposition of CO on bimetallic Co—Mo catalysts," *Chemical Physics Letters*, 317 (2000) 497-503; Maruyama, et. al. "Low-temperature synthesis of high-purity single walled carbon nanotubes from alcohol," *Chemical Physics Letters*, 360, pp. 229-234 (Jul. 10, 2002); U.S. Pat. No. 6,333,016 to Resasco, et. al.; R. E. Morjan et al., Applied Physics A, 78, 253-261 (2004), etc. All of these references are hereby by reference.

Additionally, Maruyama, S., "Morphology and chemical state of Co—Mo catalysts for growth of single-walled carbon nanotubes vertically aligned on quartz substrates," Journal of Catalysis, 225, pp. 230-239 (2004), described a method of growing single walled nanotube forest on a flat surface under vacuum. A bimetallic catalyst containing Co and Mo precursor was first deposited on a quartz surface followed by calcination and reduction to form highly dense-packed metal particles. The growth of single-walled carbon nanotubes from these metal particles presented a density of $1\times10^{17}/m^2$ with length of approximately 5 micrometers. K. Hata, "Water-assisted highly efficient synthesis of impurity-free single-walled carbon nanotubes," Science, 306, pp. 1362-1364 (2004), described another technique using water-assisted CVD method to grow single-walled carbon nanotube forest from a Si wafer coated with iron thin film. They observed water-stimulated enhanced catalytic activity results in massive growth of superdense ($10^{14}$-$10^{15}/m^2$) and vertically aligned nanotube forests with heights up to 2.5 millimeters. All of these references are hereby by reference.

Other known processes include WO 2006/130150, "Functionalized Single Walled Carbon Nanotubes" and U.S. Pat. No. 6,221,330, "Process For Producing Single Wall Nanotubes Using Unsupported Metal Catalysts And Single Wall Nanotubes Produced According To This Method" Additionally, in "Synthesis of single-walled carbon nanotubes with narrow diameter-distribution from fullerene," *Chem. Phys. Lett.*, 375, pp. 553-559 (2003), Maruyama et al. reported using alcohol as carbon source to grow single-walled carbon nanotubes at relative low temperatures, e.g. 550-800° C. The diameter distribution of those as-grown single-walled nanotubes was found to be very broad (0.8-1.3 nm) and uniformity was poor and temperature dependent. When fullerene was directly applied as carbon source, the authors found some improvement of diameter distribution to 0.8-1.1 nm, but the uniformity was still unclear according to the Raman spectroscopy. All of these references are hereby incorporated by reference.

However, currently known single walled carbon nanotube processes tend to yield a wide distribution of single walled carbon nanotube sizes. Measurements of diameters of single walled carbon nanotubes are usually done using Raman spectrometry. A typical Raman spectrometer equipped with continuous He—Ne laser with wavelength of 632.8 nm is used to collect Raman excitation. A Raman peak at ~1580 cm$^{-1}$ is present in all types of graphite samples such as highly oriented pyrolytic graphite (HOPG), pyrolytic graphite and charcoal. This peak is commonly referred to as the 'G-band'. The peak at 1355 cm$^{-1}$ occurs when the material contains defects in the graphene planes or from the edges of the graphite crystal. This band is commonly referred to as the 'D-band' and the position of this band has been shown to depend strongly on the laser excitation wavelength. "Radial breathing modes (RBM)" (typically below 300 cm$^{-1}$) were observed with single-walled nanotubes, where all the carbon atoms undergo an equal radial displacement. A small change in laser excitation frequency produces a resonant Raman effect. Investigation in the RBM has shown it to be inversely proportional to the SWCNT diameter. This relationship is expressed in the following equation, $$\omega_{RBM} = (223.75/d) \text{cm}^{-1}$$

where $\omega_{RBM}$ is the RBM frequency, and d is the SWCNT diameter (in nanometers). The relationship is slightly different for determining individual nanotubes. Bandow, et al. "Effect of the growth temperature on the diameter distribution and chirality of single-wall carbon nanotubes," *Physical Review Letters*, 80, pp. 3779-3782 (1998), Jishi, et al. "Phonon modes in carbon nanotubes," *Chemical Physics Letters*, 209, pp. 77-82 (1993). All of these references are hereby incorporated by reference.

In the above equation and throughout this specification, diameter of a nanotube is defined as the distance between the nuclei of carbon atoms at opposite ends of a tube diameter. It is to be understood that this diameter differs from distance of closest approach by a second nanotube which is greater because of the repulsion of the respective π clouds as often defined by TEM.

Table A presents sample diameter and $\omega_{RBM}$ correlations as previously reported in Tables I and II of Jorio, A, et al., "Structural (n,m) Determination of Isolated Single-Wall Carbon Nanotubes by Resonant Raman Scattering," *Physical Review Letters*, The American Physical Society, Vol. 86, No. 6, pp. 1118-21 (Feb. 5, 2001), herein incorporated by reference:

TABLE A

| (n, m) | $d_t$ [nm] | Θ [deg] | $\omega_{RBM}$ (calc) [cm$^{-1}$] | $\omega_{RBM}$ (expt.) [cm$^{-1}$] |
|---|---|---|---|---|
| (18, 6) | 1.72 | 13.9 | 144.4 | 144(2) |
| (19, 4) | 1.69 | 9.4 | 146.8 | ... |
| (20, 2) | 1.67 | 4.7 | 148.3 | ... |
| (21, 0) | 1.67 | 0.0 | 148.8 | 148(5) |
| (15, 9) | 1.67 | 21.8 | 148.8 | ... |
| (12, 12) | 1.65 | 30.0 | 150.3 | 151(3) |
| (16, 7) | 1.62 | 17.3 | 153.0 | 154(5) |
| (17, 5) | 1.59 | 12.5 | 156.4 | 156(6) |
| (13, 10) | 1.59 | 25.7 | 156.4 | 156(1) |
| (18, 3) | 1.56 | 7.6 | 158.8 | 158(1) |
| (19, 1) | 1.55 | 2.5 | 160.0 | 160(3) |
| (14, 8) | 1.53 | 21.1 | 162.0 | ... |
| (11, 11) | 1.51 | 30.0 | 164.0 | 164(1) |
| (15, 6) | 1.49 | 16.1 | 166.7 | 165(1) |
| (16, 4) | 1.46 | 10.9 | 170.4 | 169(1) |
| (17, 2) | 1.44 | 5.5 | 172.7 | 174(1) |
| (18, 0) | 1.43 | 0.0 | 173.5 | 176(1) |
| (14, 1) | 1.15 | 3.4 | 215.1 | 210(1) |
| (10, 6) | 1.11 | 21.8 | 223.1 | ... |

TABLE A-continued

| (n, m) | $d_t$ [nm] | Θ [deg] | $\omega_{RBM}$ (calc) [cm$^{-1}$] | $\omega_{RBM}$ (expt.) [cm$^{-1}$] |
|---|---|---|---|---|
| (9, 7) | 1.10 | 25.9 | 224.9 | ... |
| (11, 4) | 1.07 | 14.9 | 232.2 | 229(1) |
| (10, 5) | 1.05 | 19.1 | 236.1 | 237(2) |
| (12, 2) | 1.04 | 7.6 | 238.2 | ... |
| (8, 7) | 1.03 | 27.8 | 240.3 | 239(2) |
| (11, 3) | 1.01 | 11.7 | 244.7 | ... |

As the number of complex technical applications for carbon nanotubes increase, there is a need for an improved method for producing single walled carbon nanotubes with a more narrow size or diameter distribution so as to allow for a more precise application of single walled carbon nanotubes.

SUMMARY OF THE INVENTION

The present invention provides novel methods of preparing single walled carbon nanotubes from a metal catalyst which has been coated or seeded with fullerene. Single walled carbon nanotubes prepared in this manner have a uniform diameter. Preferred single walled carbon nanotubes include the 10,10 and 5,5 single walled carbon nanotube.

The metal catalyst is formed from a metal catalyst precursor, which is an oxide of a metal known to serve as a catalyst for carbon nanotube formation (whether single walled or multi walled carbon). Known metals catalytic for the formation of carbon nanotubes include Fe, Co, Mg, Mn, Ni and Mo. The metal catalyst and metal catalyst precursor may be supported or not supported.

Fullerene is deposited or impregnated onto the metal catalyst precursor using conventional deposition techniques. Preferably the metal catalyst precursor is coated with a thin film of fullerene. Alternatively, the fullerene may be deposited onto the metal catalyst itself (i.e., after the metal catalyst precursor has been reduced to form the metal catalyst).

In the presence of a carbon containing gas, the metal catalyst precursor/fullerene composition is then exposed to conditions suitable for reducing the metal catalyst precursor into the metal catalyst and suitable for growing single walled carbon nanotubes. In a preferred embodiment, the metal catalyst/fullerene composition is heated to a temperature below that at which the fullerenes sublime (e.g. about 650° C. for C60 fullerenes).

It is believed that the fullerene seed on the metal catalyst act as a nucleation point for the formation of single walled carbon nanotubes. The hydrocarbon gas is believed to provide the carbon source for the formation of carbon nanotubes. In the preferred embodiment, the fullerene size corresponds to the end cap of 5,5 single walled carbon nanotubes.

The methods of the present invention grow a multiplicity of single walled carbon nanotubes, wherein at least 80% of said single walled carbon nanotubes in said multiplicity have a diameter within ±5% of a single walled carbon nanotube diameter D present in the multiplicity. Diameter D may range between 0.6-2.2 nm.

DETAILED DESCRIPTION OF THE PREFERRED EMBODIMENTS

Figure 1:
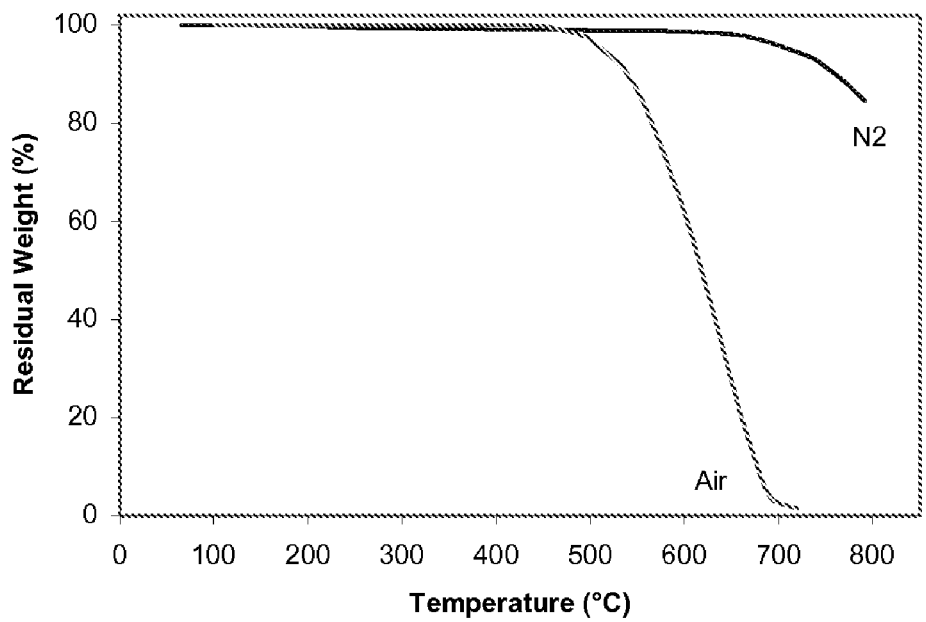
FIG. 1 displays the results of a TGA analysis for the experiment in Example 5.

The present invention provides a new method for preparing single walled carbon nanotubes from a metal catalyst which has been impregnated, deposited, coated or seeded with fullerene.

The fullerene/metal catalyst is heated in the presence of a carbon containing gas to a temperature below that at which the fullerenes sublime. It will be recognized that this is a dynamic system: fullerenes are simultaneously vaporizing and dissolving into the metal layer. Thus, the "apparent" sublimation temperature, (e.g., about 650° C. for C60 fullerenes at atmospheric pressure), is best determined by thermogravimetric analysis of an actual solid fullerene/dissolved fullerene/metal catalyst sandwich. Operable temperature ranges can be between about 500° C. to 700° C., at atmospheric pressure, depending on the fullerenes used. Inasmuch as the sublimation temperature of fullerenes is a function of pressure, if the growth step is carried out at elevated pressures, even higher fullerene sublimation temperatures may be encountered.

The carbon containing gas can include any carbon containing gases used as a carbon feedstock for the formation of carbon nanotubes, including but not limited to hydrocarbons, carbon monoxide, ketones, aldehydes, alcohols, etc.

It is believed that the partially dissolved fullerenes in contact with the metal catalyst act as nucleation center for the formation of single walled carbon nanotubes so as to "seed" or otherwise promote the nucleation and growth of single walled carbon nanotubes.

As explained previously, the initial reaction temperature should be below that at which the fullerenes sublime in order to permit the fullerenes to partially dissolve into, for example, a hemisphere or hemispherical configuration which would be a fitting end cap for single walled carbon nanotubes and thus serve as a "seed" for the growth of single walled carbon nanotubes. However, once single walled carbon nanotubes have begun to grow (e.g., the seeding has been completed), there is no longer a need to remain at this sub-sublimation temperature. The reaction temperature may be increased in order to result in higher or faster growth rates (e,g., the lengthening or elongation of the nanotube itself). Preferred higher temperatures range between about 700° C. to 1100° C. The single walled carbon nanotube growth is permitted to continue until a desired or usable length is attained. It is noted that some sublimation of fullerenes may inevitably occur.

Fullerenes

Fullerenes are a well known term of art used and recognized in the industry to refer to a form of carbon typically consisting of only carbon atoms bound together to make a roughly spherical ball (e.g., a "buckyball"). As such, the most commonly used fullerenes have sixty carbons and are known as C60 fullerenes. Any other forms of fullerenes which contain more or less than sixty carbon atoms, such as C70, C100, C36, etc., may also be used in accordance with the present invention.

Fullerenes have an approximately spherical shape ("spheroidal"). Coincidentally, the end of single walled carbon nanotubes is typically in the form of a hemisphere. As such, a half-dissolved fullerene (which resembles a hemisphere) would be a fitting end cap for a single walled carbon nanotube of the same diameter. Thus, a partially dissolved fullerene, by its hemispherical nature, would be an excellent "seed" to facilitate single walled carbon nanotube growth because its hemispherical shape is consistent with the hemispherical shape of an end of a single walled carbon nanotube. As such, bundles of single walled carbon nanotubes can be nucleated and grown from a plurality of fullerenes.

Additionally, as the seed or starting nucleation source for single walled carbon nanotube growth, the size of the fullerenes can be used to control the sizes of the single walled carbon nanotubes. For example, a skilled artisan seeking to have predominately larger sized single walled carbon nanotubes would use C100 fullerenes instead of the smaller C36 fullerenes, as the diameter of the C100 fullerenes is larger.

Under this same principle, the use of fullerenes as the seeds or nucleation points also permit greater control over the size/diameter distribution or variation of the single walled carbon nanotubes. For example, using all C60 fullerenes will result in a narrower distribution/variation of single walled carbon nanotube sizes/diameters as compared to other processes which do not control the size of the starting nucleation point or seed.

It is noted however, that the single walled carbon nanotube may be of a different diameter from the original "seeding" fullerene end cap. In the present invention, the fullerene can alternatively also serve as a nucleation promoter. That is, the fullerenes serve to promote the nucleation and growth of single walled carbon nanotubes. Thus, a bundle of single walled carbon nanotubes having a uniform diameter of 1.6 nm may result under certain conditions from 0.7 nm fullerenes. The promotion effect of fullerenes can be seen from the narrow diameter distribution of grown single walled carbon nanotubes. This results in the Raman spectrum of such product usually presenting a single peak in the RBM region instead of multiple signals indicating several different diameter populations.

Furthermore, as the seed or starting nucleation source for single walled carbon nanotube growth, the amount of fullerenes used can also be used to control the amount of single walled carbon nanotubes grown. Thus, the more fullerenes used (e.g., multiple layers of fullerenes to completely cover the metal layer surface), the more single walled carbon nanotubes can be grown. The single walled carbon nanotubes can be grown as a forest, bundle, array, or collection of nanotubes.

Alternatively, the fullerenes can be deposited onto the metal catalyst itself (i.e., after the metal catalyst precursor has been reduced to form the metal catalyst).

Metal Catalyst

In the preferred embodiment, the metal catalyst is formed from a metal catalyst precursor comprising an oxide of a metal known for catalyzing the formation of carbon nanotubes. Such metals include, but are not limited to, Fe, Co, Mg, Mn, Ni and Mo. The precursor of these metal can be in various forms including but not limited to oxide, chloride, oxalate, acetate, nitrate and carbonate.

The fullerenes are placed on a metal catalyst precursor using any conventional deposition, coating or impregnating technique known in the art. In the preferred embodiment, fullerenes are mixed into a solution of toluene. The metal catalyst precursor is added to the toluene/fullerene solution and mixed therein as well. The toluene solution is then evaporated, thereby resulting in the deposition of fullerenes onto the metal catalyst precursor.

The resulting metal catalyst precursor/fullerene composition is then exposed to reaction conditions for the formation of single walled carbon nanotubes. Reaction conditions include conditions for reducing the metal catalyst precursor (i.e, the metal oxide) or decomposing (i.e., the metal oxalate) to the metal catalyst so as to facilitate the formation of single walled carbon nanotubes. The reduction can be carried out generally under hydrogen environment at temperatures between 50 and 900° C., preferably between 200 and 750° C. Alternatively, if the fullerene is deposited on the metal catalyst itself (instead of a metal catalyst precursor), then no reduction of the metal catalyst will occur under the reaction conditions. Furthermore, the reduction and nucleation of fine metal particles via interaction with fullerene can be carried out sequentially or simultaneously. In the case of simultaneous process, the catalyst system can be treated under hydrogen or in an inert environment such as argon under the above mentioned condition. The fullerene now serves both as reducing agent and particle nucleation center.

The Resulting Single Walled Carbon Nanotubes

The methods of the present invention grow a multiplicity of single walled carbon nanotubes, wherein at least 80% of said single walled carbon nanotubes in said multiplicity have a diameter within ±5% of a single walled carbon nanotube diameter D present in the multiplicity. In other words, the diameter D represents the diameter of a particular single walled carbon nanotube present in the multiplicity by which at least 80% (preferably 80-90%, more preferably 80-95%, even more preferably 80-99%) of the remaining single walled carbon nanotubes within the multiplicity have diameters within ±5% of D. The diameter D may be measured using Raman spectroscopy and is preferably in the range between 0.6-2.2 nm, more preferably 1.0 to 1.8 nm, even more preferably 1.2 to 1.6 nm.

EXAMPLES

Specific details of several embodiments of the invention have been set forth in order to provide a thorough understanding of the present invention. It will be apparent to one skilled in the art that other embodiments can be used and changes made without departing from the scope of the present invention. Furthermore, well known features that can be provided through the level of skill in the art have been omitted or streamlined for the purpose of simplicity in order to facilitate understanding of the present invention.

The following examples further illustrate the various features of the invention, and are not intended in any way to limit the scope of the invention which is defined by the appended claims.

Example 1

Making Alumina-supported Catalyst

A slurry of 800 grams of alumina (available from Alcoa) and 10 liters of deionized water was made up in a multi-neck, 22 liter indented flask with rapid stirring. The pH of the slurry was adjusted to 6.0.

A solution A was made by mixing 52 grams of ammonium molybdate $[(NH_4)_6Mo_7O_{24}.4H_2O]$, dissolved in 500 milliliters of deionized water and 1500 grams of 41% ferric nitrate $[Fe(NO_3)_3]$ solution (9.5% Fe). Solution A and a 20% by weight ammonium carbonate solution (Solution B) were added concurrently with rapid mixing to maintain the pH at 6.0±0.5. The pH was controlled by the relative rates of addition of Solution A and Solution B. The addition took about one hour, after which the resulting slurry was vacuum filtered using #50 Whatman filter paper. The filter cake was washed thoroughly twice by reslurrying in portions in a Waring blender for two minutes at medium speed with a total volume of 8 liters of deionized water followed by vacuum filtering. The conductivity of the second wash was about 1 mMho. The filter cake was dried at 162° C. in a convection oven overnight. Samples were ground to 100-mesh and tested for productivity.

Example 2

Making $C_{60}$-promoted Catalyst 10 grams of catalyst made in e Example 1 was placed in a round-bottom flask with overhead stirrer. Designated amount of $C_{60}$ was dissolved in toluene and added drop wise to the catalyst to reach certain loading, e.g. 8% or 20% by weight of total catalyst. After evaporation of toluene, the sample was dried at 120° C. overnight.

Example 3

Making Single-wall Carbon Nanotubes Using Alumina-supported Catalyst

The productivities of the catalyst for producing single-wall carbon nanotubes was determined in a 1 inch quartz tube reactor using the following procedure: A 1 inch quartz tube was fitted with a ¼ inch thermocouple tube inserted through the bottom. At the tip of the thermocouple tube a plug of quartz wool that had been previously weighed was placed which permitted passage of gas, but not particles of catalyst or fibrils growing on the catalyst. The top of the quartz tube was fitted with a gas line which allowed for a downflow addition of one or more gases, and a modified ball valve which allowed addition of a given charge of powdered catalyst. One opening of the ball was closed off so that it became a cup or sealed cylinder. Catalyst could then be loaded into the cup and the valve assembly sealed. The contents of the cup could then be added to the gas stream without air contamination by turning the valve.

A thermocouple was inserted upward into the thermocouple tube to monitor the reactor temperature. The tube reactor was heated to desired temperature, for example 800° C., in an Argon stream to purge the reactor after which the gas stream was switched to a mixture of reactant gas such as methane at rate of 500-1000 cc/min. A weighed charge of alumina-supported catalyst (about 0.02-0.05 g) of was dropped into the downflow gas onto the quartz plug. The reactor was maintained at temperature for the about 20 minutes, after which the reactor was cooled in argon and emptied. The product analyzed by combination of Raman, SEM, and TEM showed no existence of single-wall nanotubes.

Example 4

Making Single-wall Carbon Nanotubes Using $C_{60}$-promoted Catalyst

Similar procedure was applied to test $C_{60}$-promoted catalyst made previously. The product analyzed by combination of Raman, SEM, and TEM showed existence of single-wall nanotubes along with some other byproducts such as graphite onions.

Example 5

Thermal Properties of $C_{60}$ Under Air and Inert Environment

TGA analysis was carried out to obtain the thermal properties of $C_{60}$ under air and inert environment. The results are shown in FIG. 1. As shown in FIG. 1, the fullerene started to decompose/oxidize in air at ~450° C. and evaporate in nitrogen at ~600° C. A separate experiment also indicated that iron oxide could be reduced by fibrils at temperatures lower than 600° C. Thus, it is possible that $C_{60}$ could react with metal oxide (Fe, Co or Ni) before evaporation at elevated temperatures.

A catalyst was prepared by impregnating fullerene/toluene solution to a CC catalyst (i.e., a catalyst known for generating carbon nanotubes that resemble cotton candy configuration). Then final content of $C_{60}$ in this sample was unknown (should be very low) because a later experiment showed that the $C_{60}$ could be removed with toluene vapor in a rotary evaporator. This fullerene added catalyst was then tested in methane at 900° C. and TEM analysis indicated that most of the product was short entangled multiwall nanotubes (result not shown). However, there also existed some SWs not in the form of bundles but rather in strings of 2~3 tubes. Some large SWNTs (or DWNTs) were also observed as short but very straight tubes with diameter in the range of 2~4 nm.

Example 6

Figure 2:
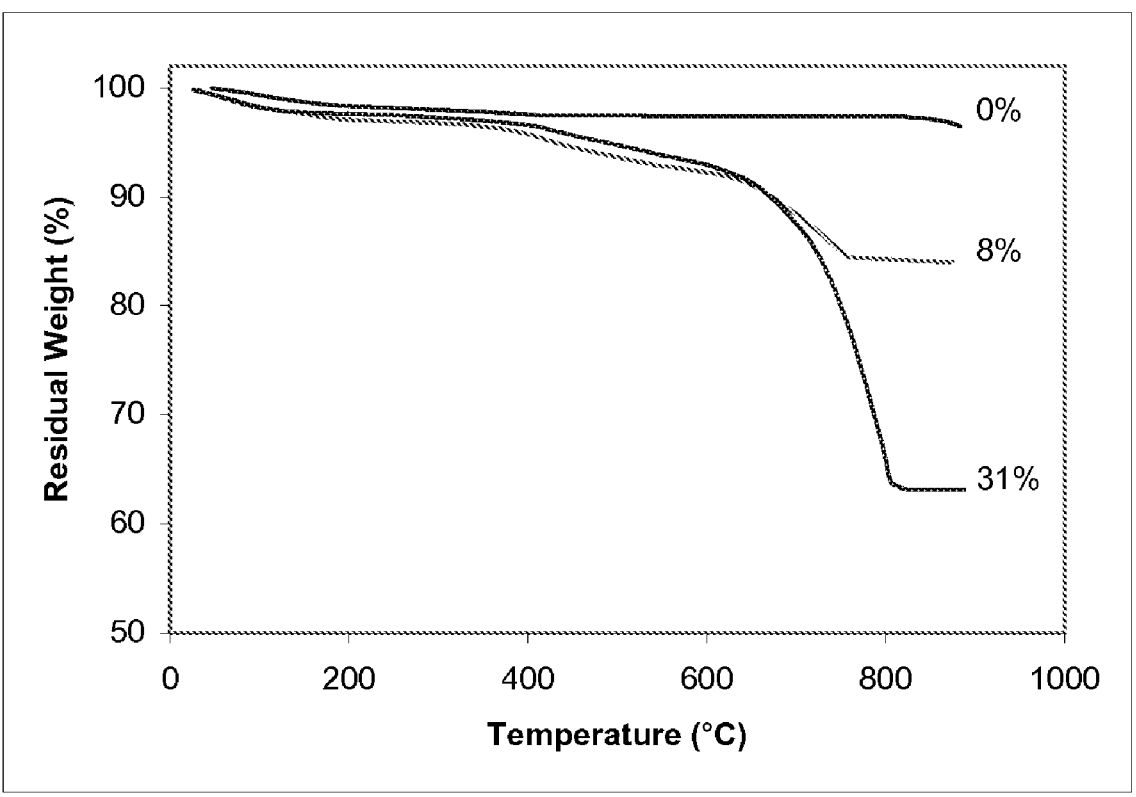
FIG. 2 displays the TGA patterns of the samples in Example 6.

In order to examine the initiation of SWNT, $C_{60}$ was added into regular CC catalyst. Some promotional effect seemed to suggest that the $C_{60}$ might be used as reducing agent and nucleation center to grow SWNT. However, the complexity of supported catalyst as well as the low solubility of $C_{60}$ in toluene made the experimental phenomenon more complicated. Thus, we added solid $C_{60}$ directly in Fe/Mo oxides (Fe:Mo=5:1 by weight). The metal oxides were prepared through precipitation of nitrate and ammonium molybdate. Two samples were prepared with loading of $C_{60}$ of 8.2 wt % and 31 wt %. The content of $C_{60}$ in the first sample was assumed to reduce just a thin layer of metal oxide, while the second sample could be completely reduced by $C_{60}$ if $C_{60}$ can actually act as a reducing agent just like other types of carbon. FIG. 2 shows the TGA patterns of these two samples when heated in $N_2$.

As seen in previous TGA pattern, $C_{60}$ can evaporate when heated in an inert environment at ~650° C. The evaporation, however, proceeded very slowly until temperature reached 750° C. and completed at ~920° C. As shown in FIG. 2, pure metal oxides won't decompose until the temperature reached 820° C. After $C_{60}$ was added, both samples were seen undergo reduction at lower temperatures. The reaction seemed to stop at ~800° C. as the weight loss curves leveled at this temperature. A question may be raised here on whether the weight loss is due to the reduction or just the evaporation of $C_{60}$. After compared to the blank run with $C_{60}$, this question can be cleared since the complete evaporation of $C_{60}$ would have to happen at temperatures above 900° C. Thus, addition of $C_{60}$ could assist the reduction of metal oxides.

Example 7

Figure 3:
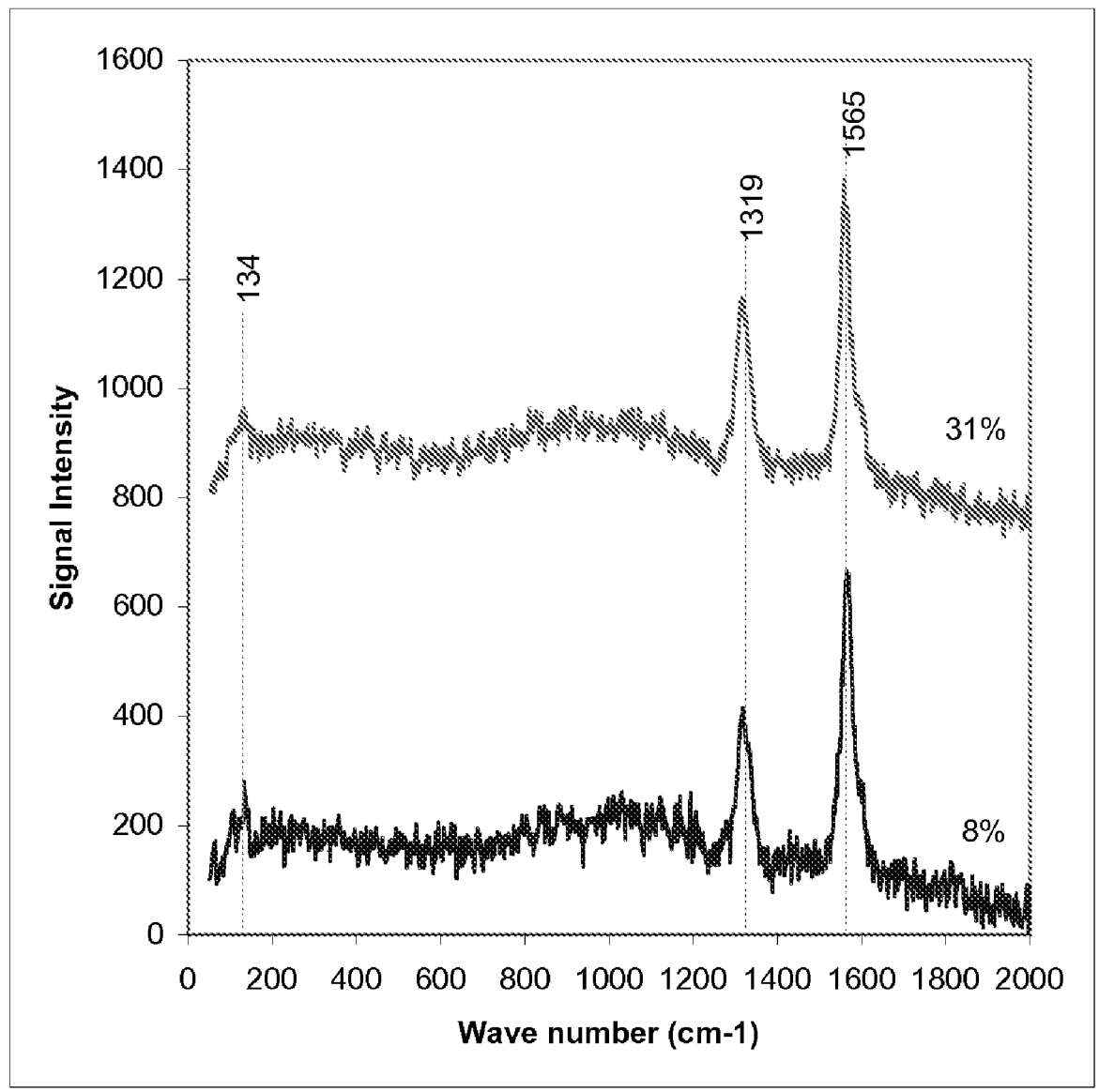
FIG. 3 displays the Raman spectras of the samples in Example 7.

The $C_{60}$ added samples were also tested under methane at 900° C. and checked using Raman after reaction. FIG. 3 shows the Raman spectroscopies of these two samples.

From FIG. 3, it appeared that there might be some SWNTs produced after the addition of $C_{60}$ as shown by the presence of some RBM peaks at ~133 cm$^{-1}$. The diameter of these structures was calculated to be ~1.6 nm. The presence of SWNTs could also be confirmed from the shape of G-band. It is interesting to notice that the intensity of RBM for 8% $C_{60}$ loaded sample was stronger than the 31% loaded one, a possible indication of proper nucleation on large metal oxide surface.

Example 8

Figure 4:
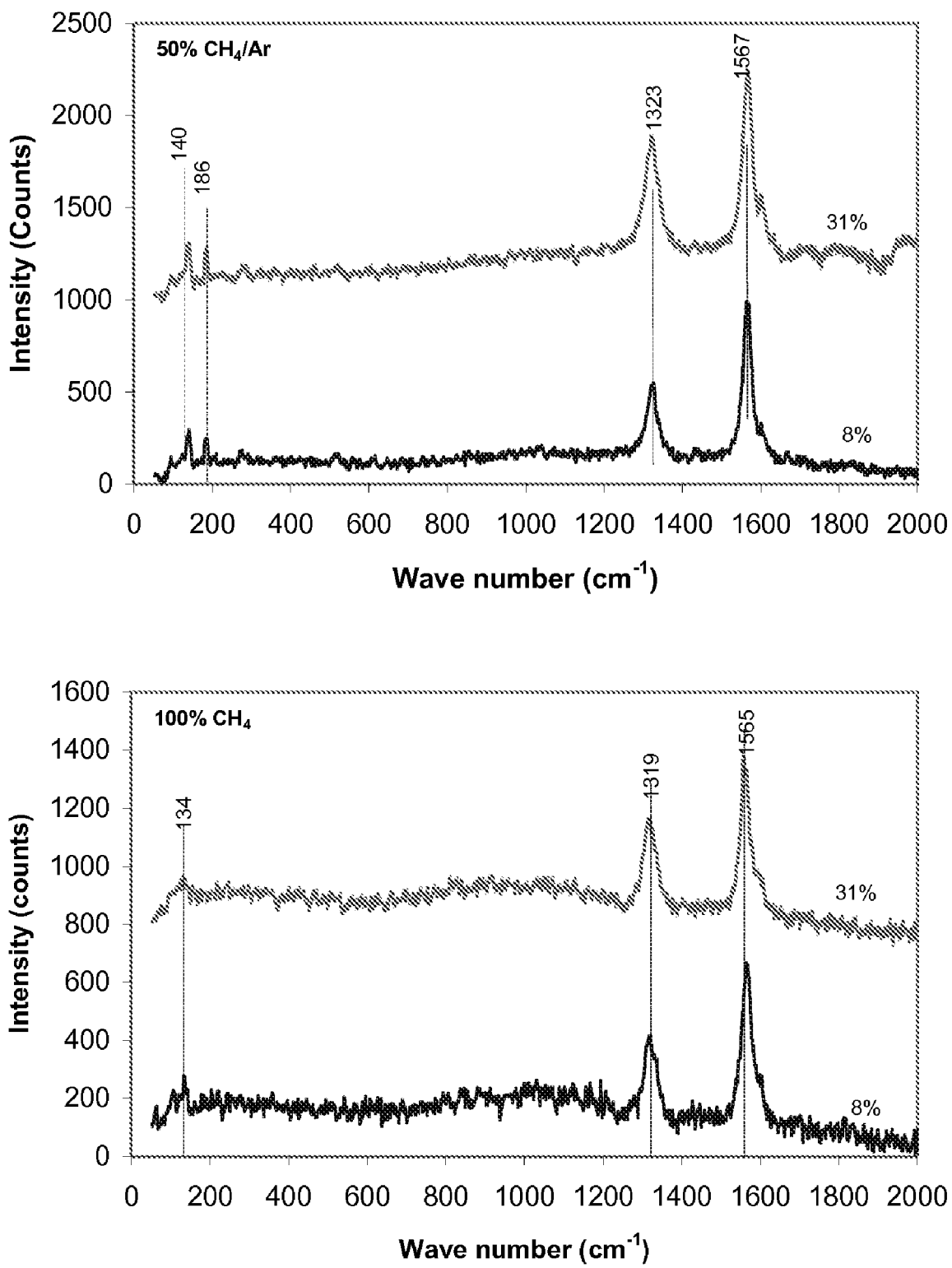
FIG. 4 displays the Raman spectras of certain samples in Example 8.

$C_{60}$ (8 wt % and 31 wt %) was added to Fe—Mo oxides as an intended initiator for growing single-walled nanotubes. Preliminary results indicated a proper quantity of $C_{60}$ might be able to partially reduce metal oxide surface during the initial stage of the reaction under methane at 900° C. These reduced metal sites could then be responsible for growing single-wall or very thin multiwall nanotubes (d=1.6 nm, 2 to 3 graphene layer) as shown in the Raman spectra of FIG. 4. These results have also been confirmed from TEM observations.

From the previous TEM examination, most of the metal particles were coated heavily with graphitic carbon, and only a few particles can actually grow tubular structures, indicating a faster carbon deposition versus diffusion through metal particles. In order to manipulate these two competitive processes, diluted methane with argon was applied as reactant.

Figure 5:
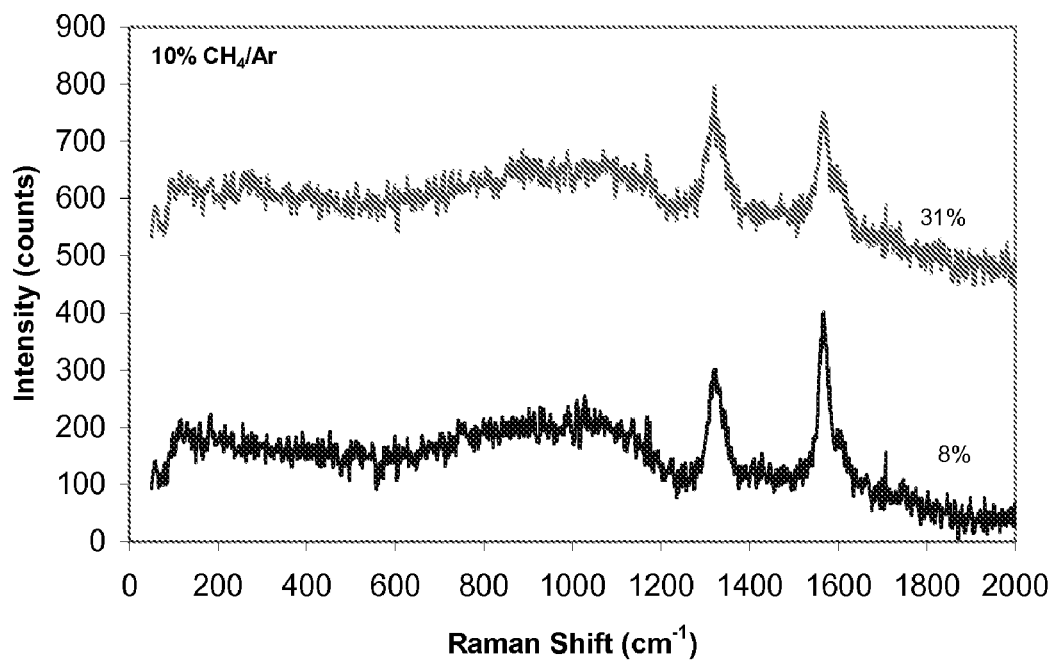
FIG. 5 displays the Raman spectras of certain samples in Example 8.
Figure 6:
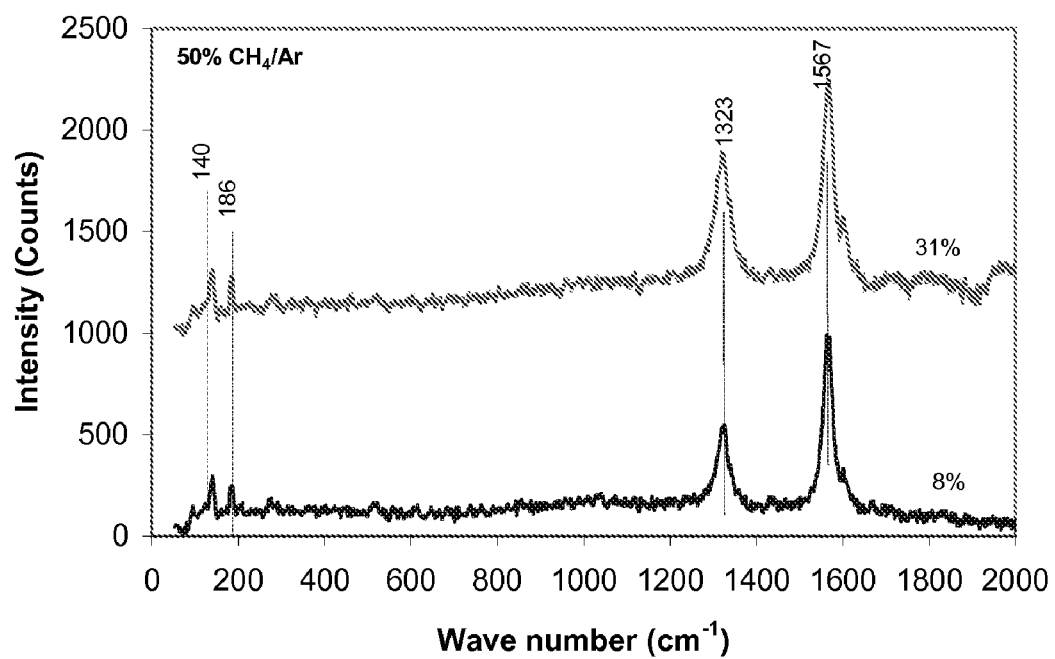
FIG. 6 displays the Raman spectras of certain samples in Example 8.

As shown in FIG. 5, 10% $CH_4$ in Ar did not yield any single-wall tubes or thin multiwall structures. The spectra looked like either big MWNTs, fibers, graphitic carbon or mixture thereof TEM study is not available at this point, but it could be concluded that the selectivity towards SW was pitiful. These two catalysts were also tested with 50% $CH_4$/Ar and the Raman spectra is shown in FIG. 6.

Clearly, there are some SW products in both samples. The catalyst with 8% $C_{60}$ appeared to give better result in term of ratio of G-band to D-band than that with 31% $C_{60}$. This phenomenon is consistent with the experiment under pure methane except that the signal intensity of radial breathing mode is much stronger. All the above results seemed suggest that even with a proper nucleation procedure to form appropriate particle size, the carbon supply rate could also weigh on the formation of single-wall structures.

Example 9

The study is now attempted at lower temperatures under methane, e.g. 800° C. The product appeared to be fluffier as compared to those from higher temperatures, an indication of possible more nanofiber content. TEM and Raman are used to characterize these samples to check the existence of SWNT.

Example 10

$C_{60}$ contained catalysts were tested at lower temperatures in methane, e.g. 700° C. and 800° C. Without pre-reduction treatment, the nature of carbon changed from graphitic to non-graphitic as the reaction temperature decreased. Although the RBM peak was still observed when reaction took place at 700° C., the intensity was very low suggesting only a trace amount of SW could form under these conditions. Our next step is to pre-reduce the catalyst before running reaction with methane or CO. The condition required to carry out this treatment is critical. Desired procedure should just reduce the Fe/Mo oxides into carbide using $C_{60}$ as carbon source. Additional reduction might cause severe sintering and lose the function of $C_{60}$ as nucleation source. The optimum condition are determined using TGA.

Example 11

Figure 7:
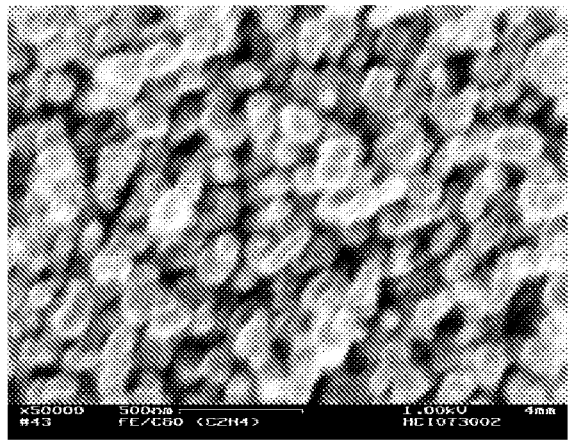
FIG. 7 displays SEM images of samples from Example 11.
Figure 7:
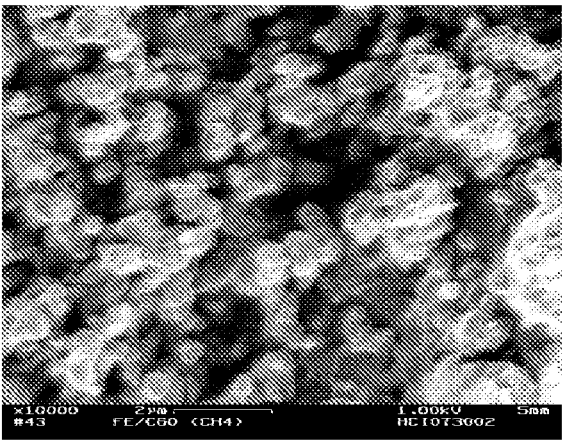
Figure 7:
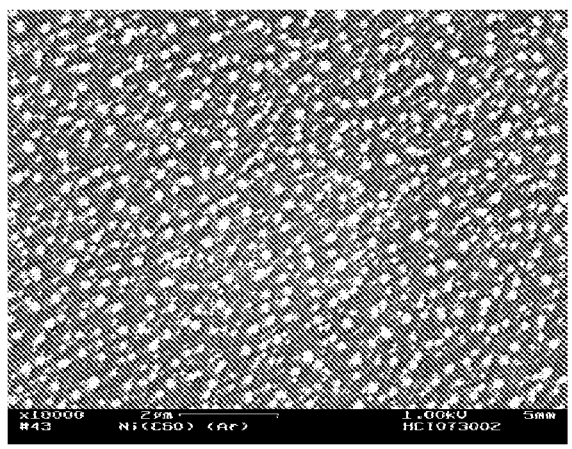
Figure 7:
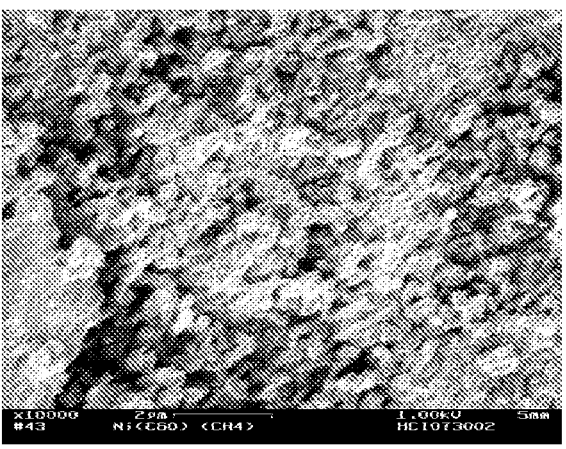
Figure 7:
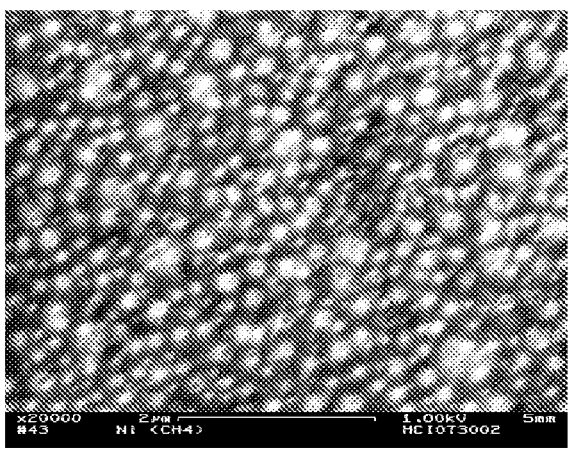
Figure 7:
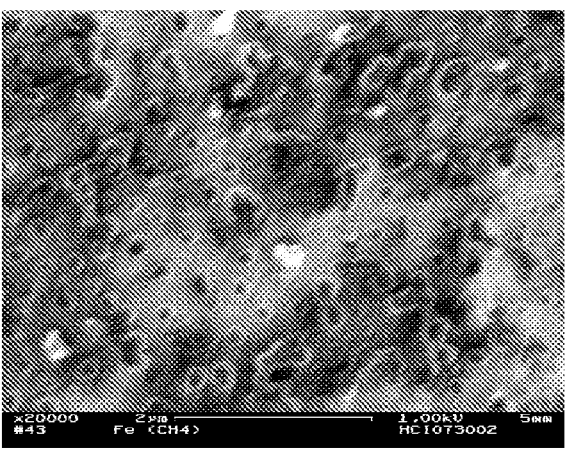

Fe, Mo and Ni film (2-10 nm) were created on Si wafers via sputtering. Selected wafers with metal film were further coated with $C_{60}$ via evaporation. Test reactions (described previously) were carried out in methane and ethylene/hydrogen. Pre-nucleation procedure via heating up in Ar up to 700° C. was also applied to $C_{60}$/metal/Si samples shown in FIG. 7.

A few conclusions can be drawn from the SEM study.

The presence of $C_{60}$ significantly enhanced carbon deposition, although mostly in the form of amorphous carbon but highly conductive, as compared to the samples without $C_{60}$. It was indicated that addition of $C_{60}$ at least assisted reduction and nucleation of metal (oxide) film.

Fe appeared to be more active than Ni to decompose methane in the presence of $C_{60}$.

Without $C_{60}$, during reaction in methane Ni film broke into particles, many of which adopted a "donut-like" morphology, typical sign of partial reduction. While nucleation of Fe film was more complicated.

Example 12

Figure 8:
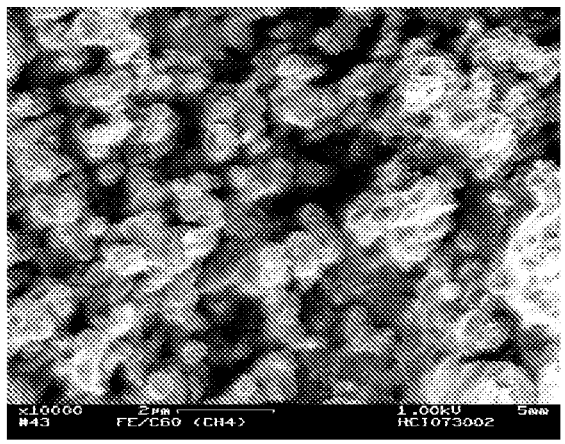
FIG. 8 displays SEM images of samples from Example 12.
Figure 8:
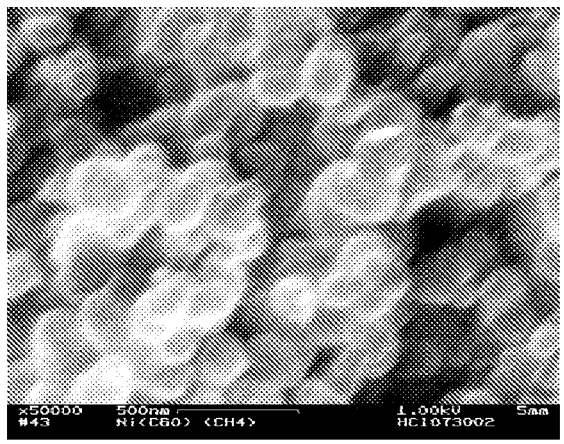
Figure 8:
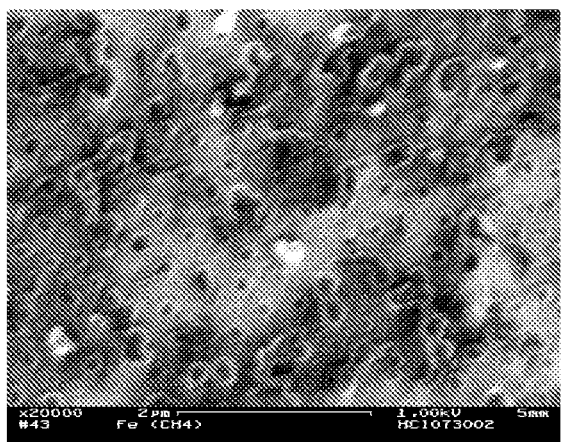
Figure 8:
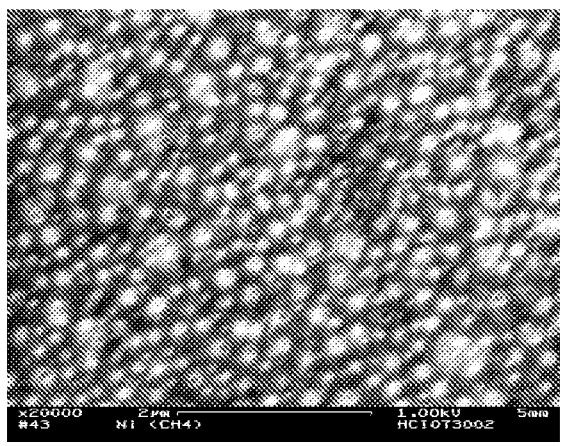

Fe, Mo and Ni film (2-10 nm) were created on Si wafers via sputtering. Selected wafers with metal film were further coated with $C_{60}$ via evaporation. Test reactions (described previously) were carried out in methane and ethylene/hydrogen at 900° C. and 600° C. respectively. Pre-nucleation procedure via heating up in Ar up to 700° C. was also applied to $C_{60}$/metal/Si samples. Fe, Ni, Fe—$C_{60}$ and Ni—$C_{60}$ tested in methane at 900° C. were examined using SEM after the reaction. As shown in these SEM images in FIG. 8, no tubular growth was observed. Instead, with the presence of $C_{60}$, the catalyst particles after reaction were significantly larger and possibly coated with pyrolytic carbon as compared to the samples without $C_{60}$. Carbon yield was estimated to be extremely low in the case of Fe/Si as the particles (mainly Fe oxides) seen under SEM exhibited very poor conductivity.

Example 13

Continuous focus on promotional effect by the presence of $C_{60}$ was carried out on model catalysts recently. Two primary catalyst systems were prepared, namely Fe and $Fe_2O_3$ (made through calcination of Fe/Si in air) supported on Si wafer. The thickness of Fe film was set at 5 nm. A second coating of $C_{60}$ (approx. 10 nm) was also made on top of metal or metal oxide film. These two model catalysts were then subject to various pretreatment as well as reaction with methane.

Figure 9:
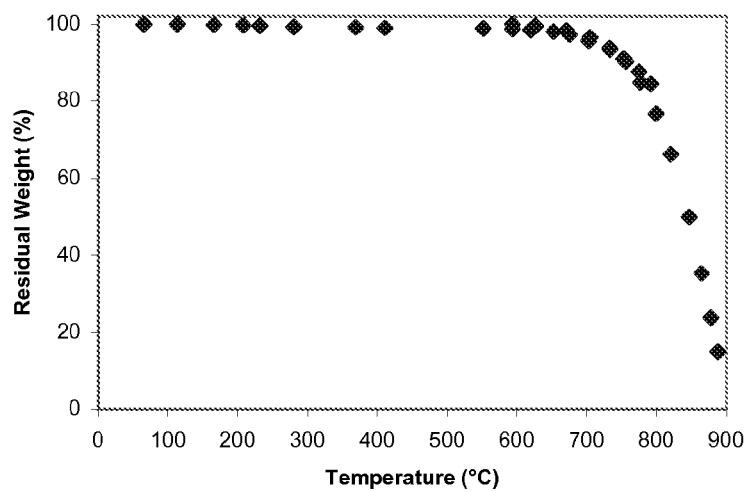
FIG. 9 displays a TGA pattern for the experiment in Example 13.

A typical TGA pattern of $C_{60}$ evaporation upon heating in an inert environment is shown in FIG. 9. The evaporation/sublimation starts at around 650° C. and proceeds approximately 20% up to 800° C. Total evaporation may be achieved at 900° C. According to this data, we can choose various pretreatment conditions to selectively react solid, gaseous or their combinations of $C_{60}$ with metal precursors in order to investigate the impact of $C_{60}$ as metal nucleation seeds.

Example 14

Example 13 was conducted with $C_{60}$/$Fe_2O_3$/Si.

| Run # | Sample | Treatment | Reaction |
|---|---|---|---|
| 1 | $C_{60}$/$Fe_2O_3$/Si | Heated up to 800° C. under Ar | N/A |
| 2 | $C_{60}$/$Fe_2O_3$/Si | Dropped into reactor at 800° C. under Ar | 10 min |
| 3 | $C_{60}$/$Fe_2O_3$/Si | Dropped into reactor at 900° C. under Ar | 10 min |
| 4 | $C_{60}$/$Fe_2O_3$/Si | Dropped into reactor at 900° C. under Ar for 2 min | Continued with $CH_4$ for 8 min at 900° C. |
| 5 | $C_{60}$/$Fe_2O_3$/Si | Dropped into reactor at 800° C. under Ar for 2 min | Continued with $CH_4$ for 8 min at 800° C. |
| 6 | $C_{60}$/$Fe_2O_3$/Si | Dropped into reactor at 700° C. under Ar for 2 min | Continued with $CH_4$ for 8 min at 700° C. |
| 7 | $C_{60}$/$Fe_2O_3$/Si | Dropped into reactor at 650° C. under Ar for 2 min | Continued with $CH_4$ for 8 min |
| 8 | $C_{60}$/$Fe_2O_3$/Si | Heated in $H_2$ to 200° C. then cooled to RT | Dropped into reactor under $CH_4$ at 900° C. for 10 min |

-continued

| Run # | Sample | Treatment | Reaction |
|---|---|---|---|
| 9 | $C_{60}/Fe_2O_3/Si$ | Heated in $H_2$ to 200° C. then cooled to RT | Dropped into reactor under $CH_4$ at 800° C. for 10 min |

Figure 10:
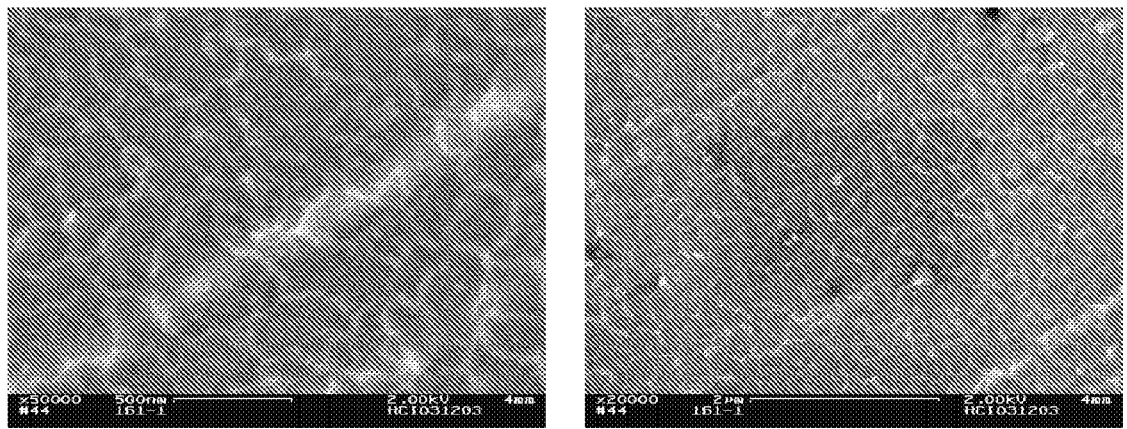
FIG. 10 displays SEM images of select samples in Example 14.

A typical $C_{60}/Fe_2O_3/Si$ sample is shown in the electron micrographs in FIG. 10. There are many particles, possibly $Fe_2O_3$, in the range of 20-30 nm.

Figure 11:
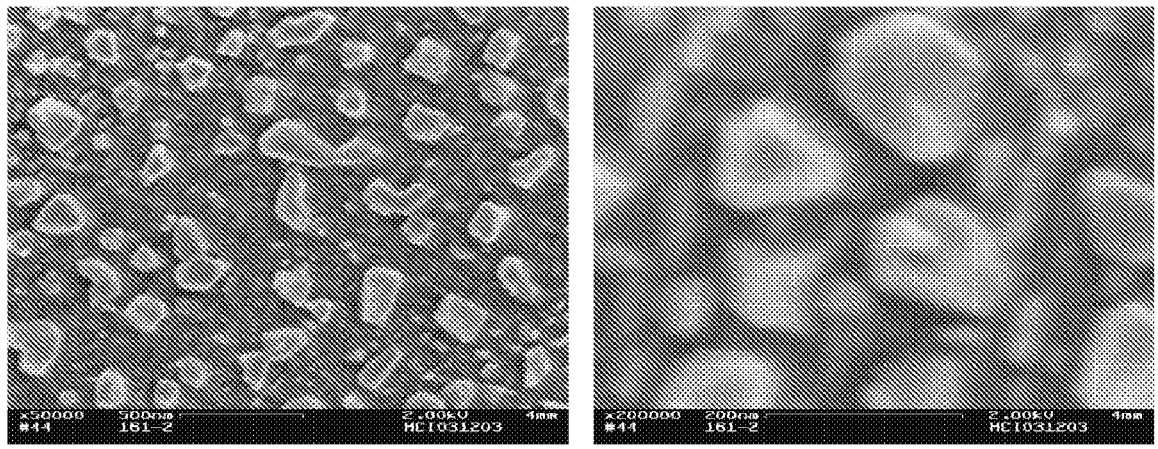
FIG. 11 displays SEM images of select samples in Example 14.

Run #1: Direct heating of $Fe_2O_3/Si$ with $C_{60}$ resulted in the formation of some large metal particles. Generally, these kinds of large sizes were not expected from a 5 nm-thick metal film unless severe sintering happened. In addition to these large particles, there also existed some small particles that dramatically differed from the others. From the pictures shown in FIG. 11, it almost looks like a bi-model distribution. There might be a rationale behind this phenomenon, that is, big particles resulted from sintering of metal particles, while small ones are actually in an intermediate state, perhaps a carbidic form, which tends to have more resistance to sintering. The possible aggregation of $C_{60}$ could contribute to this result. Metal oxide particles that were adjacent to these fullerenes tended to get reduced easily via contact or within short diffusion ranges, while the rest of particles relied more on diffusion limitation that eventually restricted the total quantity of $C_{60}$ that can react with them. Thus, an intermediate state might be produced.

Figure 12:
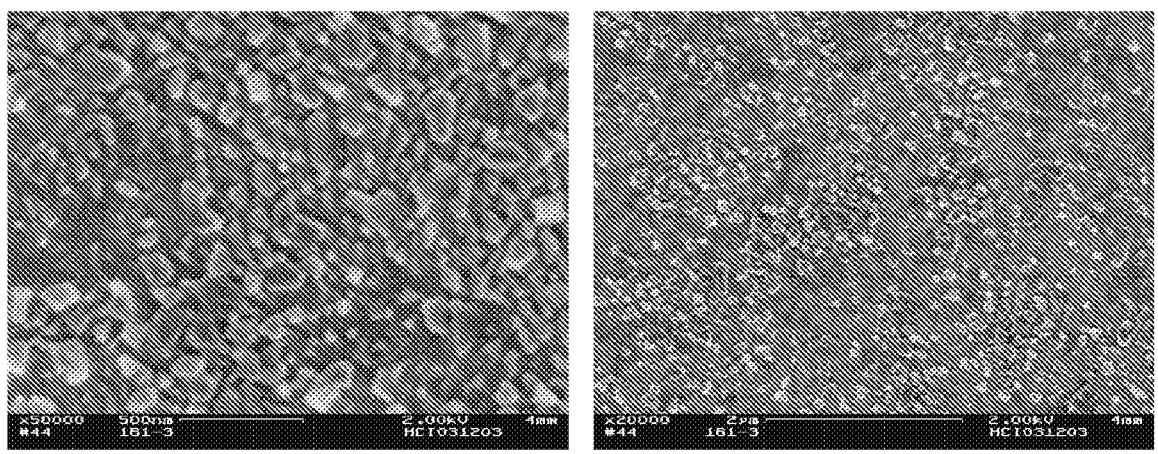
FIG. 12 displays SEM images of select samples in Example 14.

Run #2: Instead of slow heating, direct drop into hot reactor at 800° C. made the case more clear. Under this condition, both solid and gaseous $C_{60}$ presented. As shown in the pictures in FIG. 12, the resulting particles didn't appear to have the dramatic difference in size as observed under slow heating. In fact, the particles had a broader size distribution, which implied less selective reduction by fullerenes.

Figure 13:
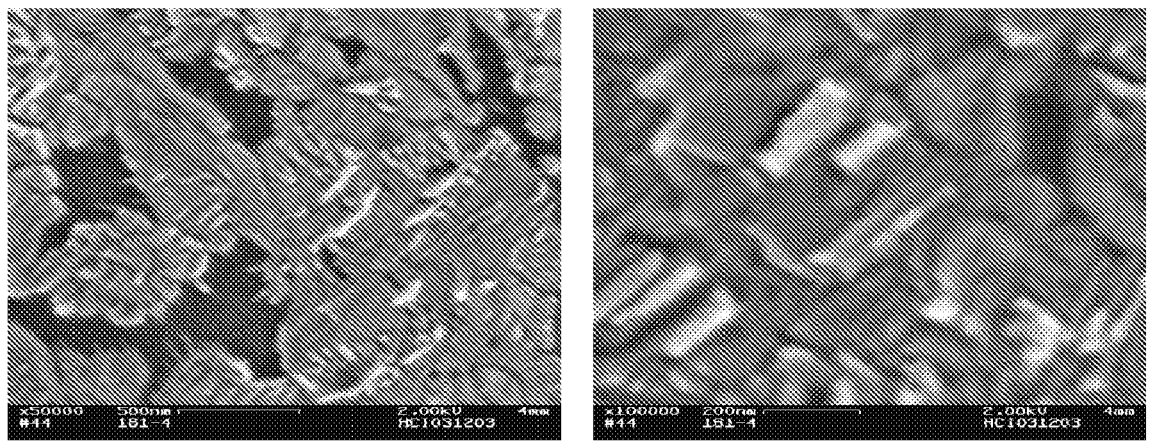
FIG. 13 displays SEM images of select samples in Example 14.

Run #3: propping into 900° C. reactor brought somewhat confusing images as shown in FIG. 13. At this temperature, majority of $C_{60}$ is expected to evaporate immediately and the reaction is more likely between metal oxides and $C_{60}$ vapor. Resulting particles seemed to be fused together. Some interstitial space also appeared to have some type of short fibers.

Figure 14:
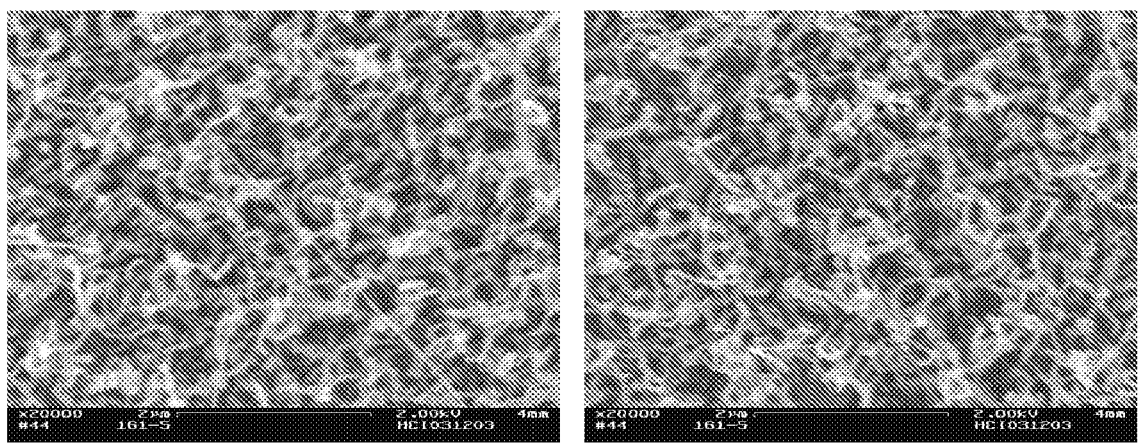
FIG. 14 displays SEM images of select samples in Example 14.

Run #4: The above sample after being dropped into reactor at 900° C. for 2 minutes was provided with methane as continuous carbon source. SEM shown in FIG. 14 revealed massive growth of short entangled carbon fibers. However, no SW signal was picked up by Raman analysis.

Figure 15:
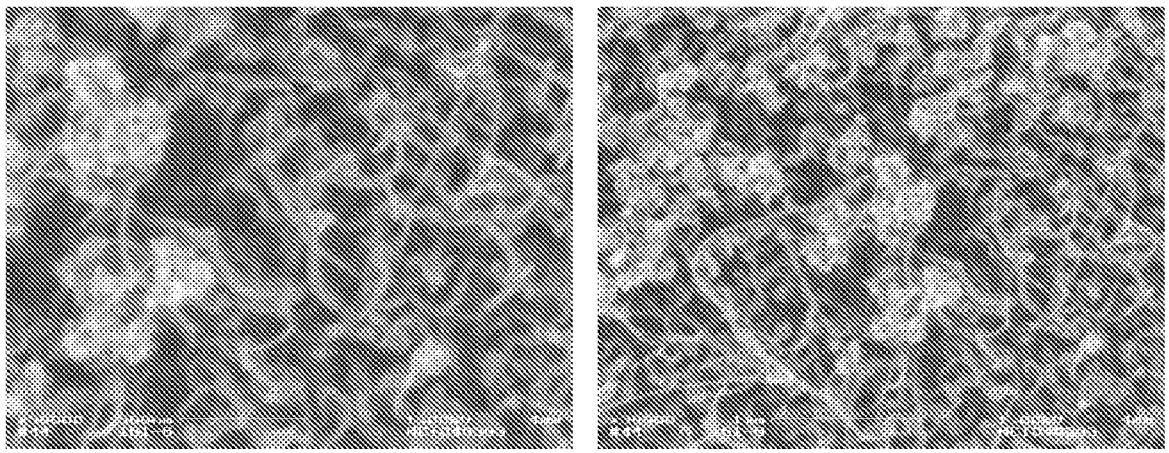
FIG. 15 displays SEM images of select samples in Example 14.

Run #5: The effect of particle size on the selectivity of single-walled tubes started to show up at lower reaction temperatures as shown in FIG. 15. At 800° C., single-walled tubes can grow from some catalyst particles even though the majority of particles have large sizes after being dropped into 800° C. zone under Ar. Raman analysis verified the existence of SWs.

Example 15

Example 13 was conducted with $C_{60}/Fe/Si$.

| Run # | Sample | Treatment | Reaction |
|---|---|---|---|
| 1 | $C_{60}/Fe/Si$ | Dropped into reactor at 800° C. under Ar | 10 min |
| 2 | $C_{60}/Fe/Si$ | Dropped into reactor at 800° C. under Ar for 1 min | Continued with $CH_4$ for 9 min at 800° C. |
| 3 | $C_{60}/Fe/Si$ | Dropped into reactor at 900° C. under Ar | 10 min |
| 4 | $C_{60}/Fe/Si$ | Dropped into reactor at 900° C. under Ar for 1 min | Continued with $CH_4$ for 9 min at 900° C. |
| 5 | $C_{60}/Fe/Si$ | Slowly heated up to 750° C. under Ar, then cooled to RT | Dropped into reactor at 800° C. under $CH_4$ for 10 min |
| 6 | $C_{60}/Fe/Si$ | Slowly heated up to 750° C. under Ar, then cooled to RT | Dropped into reactor at 900° C. under $CH_4$ for 10 min |

Figure 16:
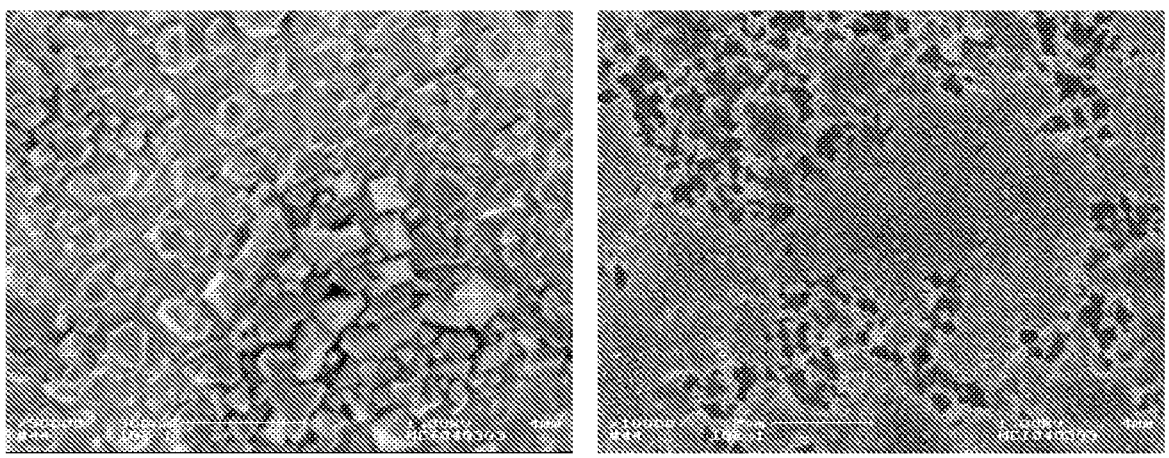
FIG. 16 displays SEM images of select samples in Example 15.

In this series, Fe and $C_{60}$ were deposited subsequently without exposure to air. It was assumed that $C_{60}$ might have greater impact on the nucleation of metal particles. During Run #1, direct drop of $C_{60}/Fe/Si$ into a 800° C. reactor zone didn't yield much different information as compared to $C_{60}/Fe_2O_3/Si$. As shown in FIG. 16, particles were found to be faceted and have various sizes.

Figure 17:
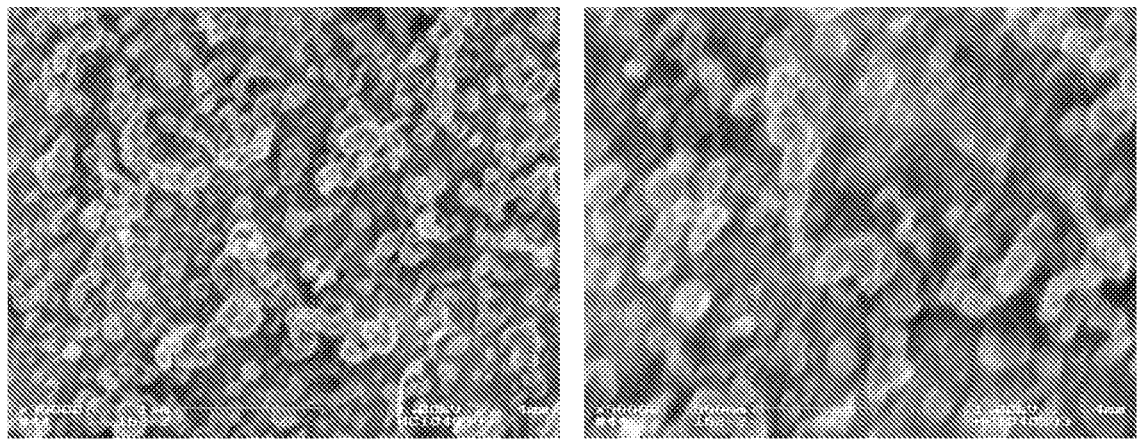
FIG. 17 displays SEM images of select samples in Example 15.

Run #2: The sample heated in an 800° C. zone followed by reaction with methane behaved differently from $C_{60}/Fe_2O_3/Si$. Carbon deposit, if any, mostly presented as carbon coating on the surface of metal particles. As shown in the SEM image in FIG. 17, there is a thin fiber that could be a SW bundle, however, selectivity like this would be pitiful.

Figure 18:
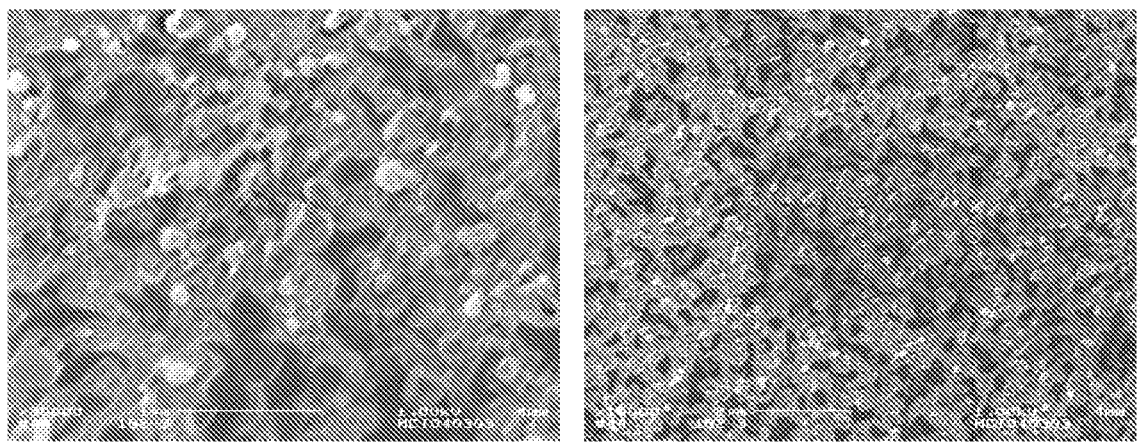
FIG. 18 displays SEM images of select samples in Example 15.

Run #3: Once again heated in a 900° C. reactor zone under Ar yielded some confusing images as shown in FIG. 18.

Figure 19:
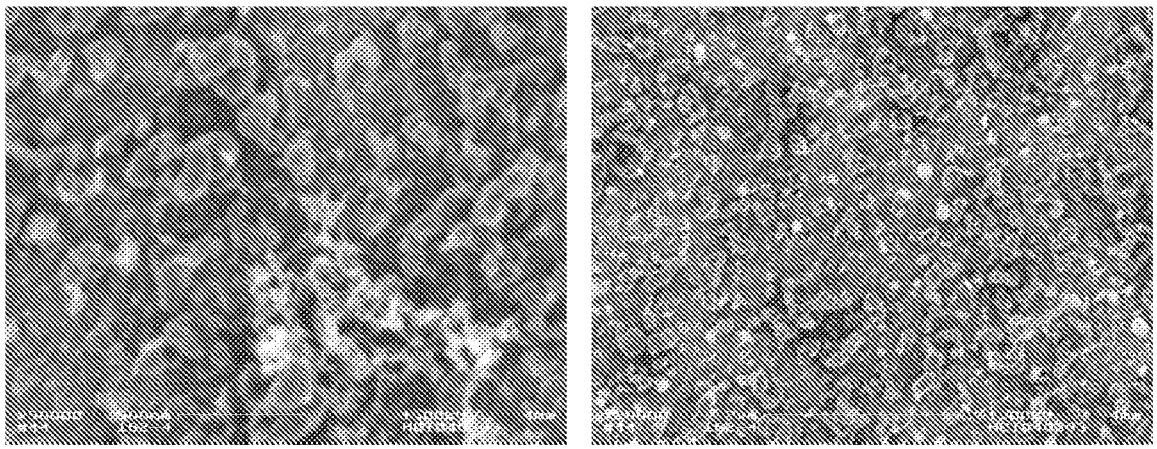
FIG. 19 displays SEM images of select samples in Example 15.

Run #4: Subsequent supply with methane to the above sample also produced mostly coating. As shown in FIG. 19, no visual evidence of SWs was found.

Figure 20:
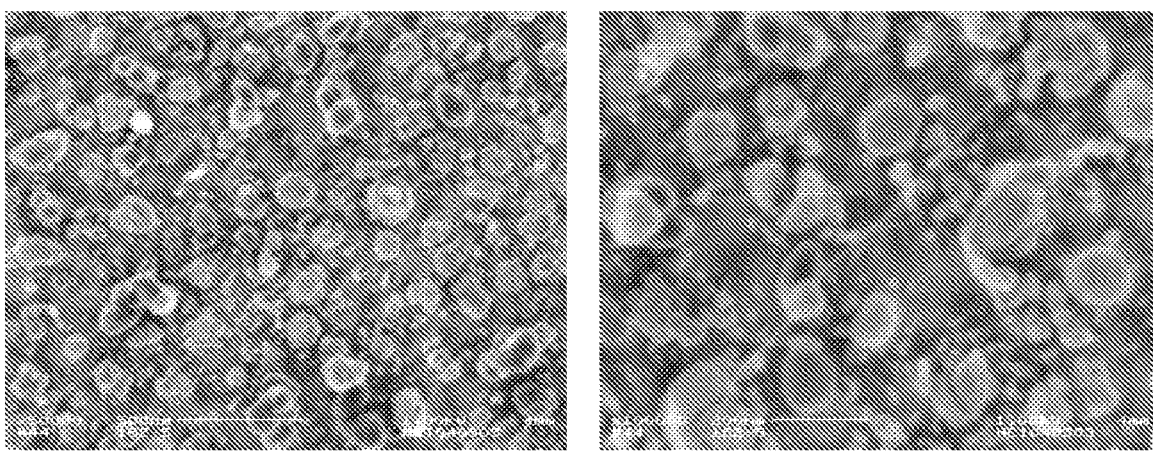
FIG. 20 displays SEM images of select samples in Example 15.

Run #5: The experiment was intended to utilize only the solid $C_{60}$ to nucleate iron particles. Similar to the first series, a bi-model particle size distribution appeared after heating the sample up to 750° C. under Ar. This sample was then retracted from the reactor and re-entered it under methane after its temperature reached 800° C. Large particles were seen getting larger with apparent carbon coating as faceted faces rounded up. Some very thin fibers were also observed. Based on their shape (straight) and sizes as shown in FIG. 20, they are likely single-walled tube bundles.

Figure 21:
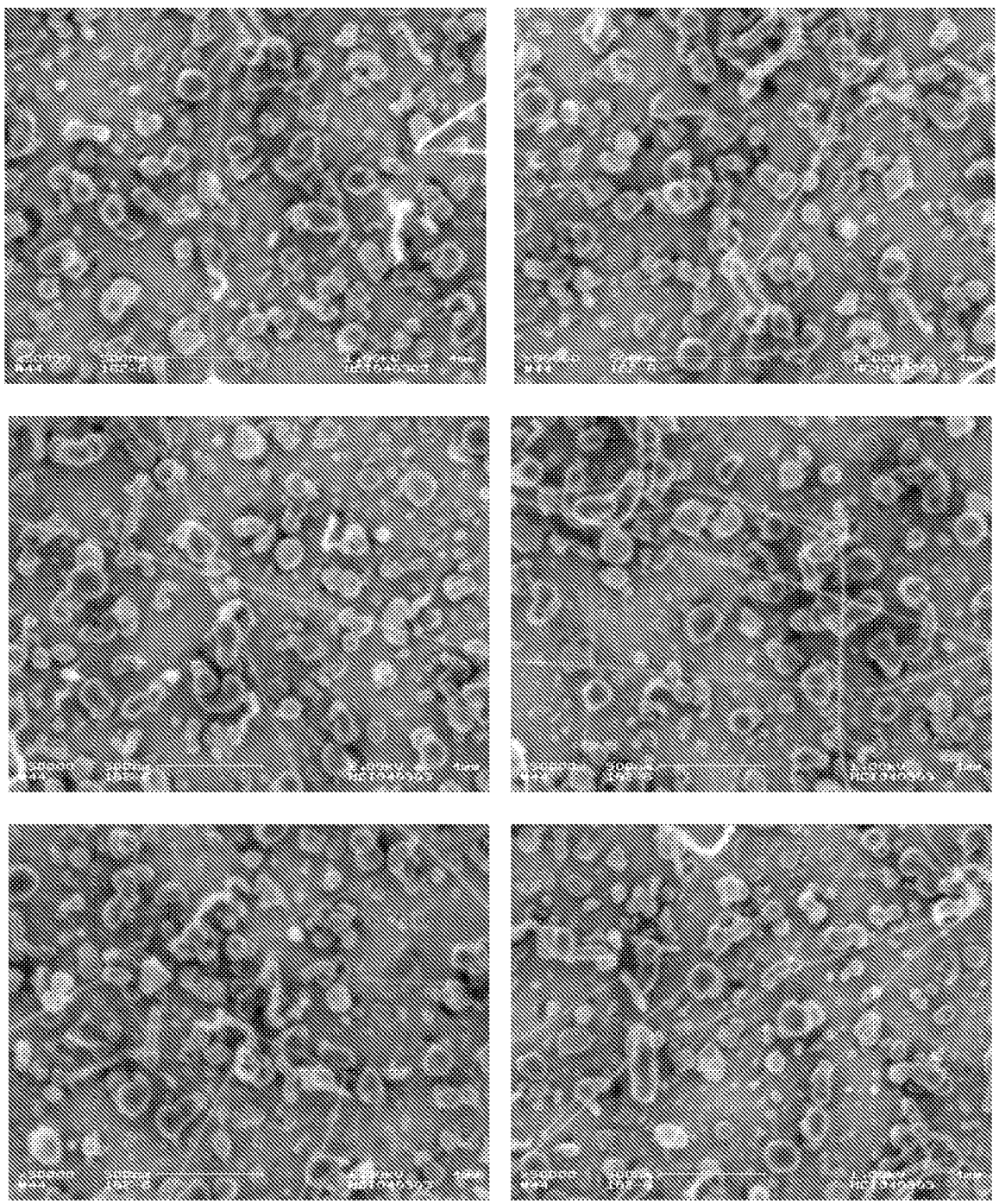
FIG. 21 displays SEM images of select samples in Example 15.

Run #6 became more prominent as compared to Run #5. At 900° C., the catalytic activity of iron particles was higher than those at 800° C. Many more SW bundles were observed as shown in FIG. 21. More interestingly, in both runs, carbon deposits presented either as carbon coating or thin fibers, hardly any other types of carbon products were observed. As discussed in a previous chapter, slow heating might produce particles in a possible intermediate state, where particles had small particles and better sintering resistance. It is then speculated that some of these particles may be active for growing single-wall tubes under appropriate conditions.

Results from the above two experiment series demonstrated a broad spectrum from two extreme scenarios, no activity and active in growing single-wall tubes. It is clear that with careful manipulation of pretreatment conditions inactive metal catalyst can have fairly good activities. Problems were experienced with sample preparation, which should have ensured thin and uniform coating with designated thickness. Amount of $C_{60}$ in these samples might also be excessive. Reduced $C_{60}$ quantity should just allow to generate particles in the intermediate state without further reduction to metallic form.

We claim:

1. A method for producing single walled carbon nanotubes comprising:
   (a) reacting a carbon containing gas under reaction conditions with a composition comprising
       fullerene on a precursor of a metal catalyst, wherein the precursor of a metal catalyst is coated with a thin film of fullerene, and
       wherein said reaction conditions are suitable for reducing said metal catalyst precursor, said conditions being at atmospheric pressure or greater; and
   (b) growing single walled carbon nanotubes, wherein said fullerene serves as a seed for growth of the single walled carbon nanotubes.

2. The method of claim 1, wherein said metal catalyst precursor comprises a metal selected from the group consisting of Fe, Co, Mn, Ni and Mo.

3. The method of claim 1, wherein said reaction conditions are suitable for non-subliming said fullerene, and wherein the temperature of said reaction condition is lower than the sublimation temperature of said fullerene.

4. The method of claim 1, wherein said single walled carbon nanotubes comprise a multiplicity of single walled carbon nanotubes, wherein at least 80% of the single walled carbon nanotubes in said multiplicity have a diameter within ±5% of a single walled carbon nanotube diameter D present in said multiplicity, said diameter D being in the range between 0.6-2.2 nm.

5. The method of claim 4, wherein the diameter D is within the range of 1.0 to 1.8 nm.

6. The method of claim 4, wherein the diameter D is within the range of 1.2 to 1.6 nm.

7. The method of claim 1, wherein the composition comprising fullerene on a precursor of a metal catalyst is formed by a method comprising:
   mixing fullerene into a solution of toluene;
   adding a precursor of a metal catalyst to the solution;
   mixing the precursor of a metal catalyst in the solution; and
   evaporating the solution, thereby resulting in deposition of fullerene on the precursor of a metal catalyst.

8. The method of claim 1, wherein said metal catalyst precursor comprises a form selected from the group consisting of an oxide, chloride, oxalate, acetate, nitrate and carbonate.

9. The method of claim 1, wherein said metal catalyst precursor comprises a form selected from the group consisting of an chloride, oxalate, acetate, and carbonate.

10. A method for producing single walled carbon nanotubes comprising:
    (a) forming a composition comprising fullerene on a precursor of a metal catalyst, wherein the precursor of a metal catalyst is coated with a thin film of fullerene,
    (b) reacting a carbon containing gas in the presence of said composition under reaction conditions suitable for reducing said metal catalyst precursor, wherein the temperature of said reaction condition is lower than the sublimation temperature of said fullerene and the pressure of said reaction condition is 1 atmosphere or greater, and
    (c) growing single walled carbon nanotubes having a single raman peak in the RBM region, wherein said fullerene serves as a seed for growth of the single walled carbon nanotubes.

11. The method of claim 10, wherein said single walled carbon nanotubes comprise a multiplicity of single walled carbon nanotubes, wherein at least 80% of the single walled carbon nanotubes in said multiplicity have a diameter within ±5% of a single walled carbon nanotube diameter D present in said multiplicity, said diameter D being in the range between 0.6-2.2 nm.

12. The method of claim 11, wherein the diameter D is within the range of 1.2 to 1.6 nm.

13. A method for producing single walled carbon nanotubes comprising:
    (a) forming a composition comprising fullerene on a metal catalyst, wherein the metal catalyst is coated with a thin film of fullerene,
    (b) reacting a carbon containing gas in the presence of said composition at a temperature lower than the sublimation temperature of said fullerene and at atmospheric pressure or greater, and
    (c) growing a multiplicity of single walled carbon nanotubes, wherein at least 80% of the single walled carbon nanotubes in said multiplicity have a diameter within ±5% of a single walled carbon nanotube diameter D present in said multiplicity, said diameter D being in the range between 0.6-2.2 nm, wherein said fullerene serves as a seed for growth of the single walled carbon nanotubes.

14. The method of claim 13, wherein the diameter D is within the range of 1.2 to 1.6 nm.

15. The method of claim 13, wherein forming a composition comprising fullerene on a metal catalyst comprises:
    mixing fullerene into a solution of toluene;
    adding the metal catalyst to the solution;
    mixing the metal catalyst in the solution; and
    evaporating the solution, thereby resulting in deposition of fullerene on the metal catalyst.

* * * * *